(12) United States Patent
Nagata et al.

(10) Patent No.: US 9,037,076 B2
(45) Date of Patent: May 19, 2015

(54) RADIO RELAY STATION APPARATUS AND RADIO RELAY METHOD

(75) Inventors: Satoshi Nagata, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 237 days.

(21) Appl. No.: 13/703,375

(22) PCT Filed: Jun. 15, 2011

(86) PCT No.: PCT/JP2011/063741
§ 371 (c)(1),
(2), (4) Date: Jan. 7, 2013

(87) PCT Pub. No.: WO2011/162143
PCT Pub. Date: Dec. 29, 2011

(65) Prior Publication Data
US 2013/0109297 A1    May 2, 2013

(30) Foreign Application Priority Data

Jun. 21, 2010  (JP) .................................. 2010-140337

(51) Int. Cl.
| | |
|---|---|
| *H04B 7/14* | (2006.01) |
| *H04W 84/04* | (2009.01) |
| *H04B 7/155* | (2006.01) |
| *H04W 24/00* | (2009.01) |
| *H04W 88/08* | (2009.01) |

(52) U.S. Cl.
CPC ................. *H04B 7/14* (2013.01); *H04W 24/00* (2013.01); *H04W 84/047* (2013.01); *H04B 7/15528* (2013.01); *H04W 88/085* (2013.01)

(58) Field of Classification Search
CPC ....... H04B 7/2606; H04B 7/02; H04W 72/04; H04W 40/08
See application file for complete search history.

(56) References Cited

U.S. PATENT DOCUMENTS

| | | | | |
|---|---|---|---|---|
| 7,072,612 | B2* | 7/2006 | Soliman ........................ | 455/13.1 |
| 7,319,714 | B2* | 1/2008 | Sakata et al. ................... | 375/211 |
| 7,502,407 | B2* | 3/2009 | Sakata et al. ................... | 375/211 |
| 7,702,280 | B2* | 4/2010 | Takeda et al. ..................... | 455/7 |
| 7,970,344 | B2 | 6/2011 | Horiuchi et al. | |

(Continued)

FOREIGN PATENT DOCUMENTS

| | | |
|---|---|---|
| JP | 2002-26923 A | 1/2002 |
| WO | 2006/070665 A1 | 7/2006 |

OTHER PUBLICATIONS

Notification of Reasons for Rejection for Japanese Application No. 2010-140337 dated Mar. 5, 2013, with English translation thereof (5 pages).

(Continued)

*Primary Examiner* — Bobbak Safaipour
(74) *Attorney, Agent, or Firm* — Osha Liang LLP

(57) ABSTRACT

To provide a radio relay station apparatus and radio relay method for enabling the radio relay station apparatus to identify a multi-hop relay signal and relay a downlink signal suitably, a first radio relay station apparatus or a radio base station apparatus generates a control signal indicative of passing through a radio relay station apparatus, and transmits the control signal in downlink, and a second radio relay station apparatus receives the control signal, demodulates a downlink signal based on the control signal, modulates the demodulated downlink signal, and transmits the modulated downlink signal.

2 Claims, 9 Drawing Sheets

(56) References Cited

U.S. PATENT DOCUMENTS

| | | | |
|---|---|---|---|
| 7,991,352 B2* | 8/2011 | Suh et al. | 455/8 |
| 8,000,650 B2* | 8/2011 | Chang et al. | 455/11.1 |
| 8,515,341 B2* | 8/2013 | Yuda et al. | 455/11.1 |
| 8,605,643 B2* | 12/2013 | Chang et al. | 370/315 |
| 2003/0063607 A1* | 4/2003 | Adachi et al. | 370/389 |
| 2004/0102219 A1* | 5/2004 | Bunton et al. | 455/560 |
| 2004/0105382 A1* | 6/2004 | Miyoshi et al. | 370/204 |
| 2004/0242154 A1* | 12/2004 | Takeda et al. | 455/16 |
| 2007/0178831 A1* | 8/2007 | Takeda et al. | 455/7 |
| 2008/0305740 A1* | 12/2008 | Horiuchi et al. | 455/11.1 |
| 2011/0199956 A1* | 8/2011 | Wu | 370/315 |

OTHER PUBLICATIONS

International Search Report issued in PCT/JP2011/063741 mailed Sep. 6, 2011 (4 pages).
Patent Abstracts of Japan, Publication No. JP2002-026923 dated Jan. 25, 2002 (1 page).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

* cited by examiner

RADIO RELAY STATION APPARATUS AND RADIO RELAY METHOD

TECHNICAL FIELD

The present invention relates to a radio relay station apparatus and radio relay method using relay transmission techniques in an LTE-A (Long Term Evolution-Advanced) system.

BACKGROUND ART

In the 3GPP ($3^{rd}$ Generation Partnership Project), standardization of LTE-Advanced (LTE-A) has proceeded, as the 4G mobile communication system to actualize communications of higher speed and larger capacity than LTE (Long Term Evolution) that is evolved specifications of the 3G mobile communication system. In addition to actualization of high-speed large-capacity communications, in LTE-A, improvements in throughput in cell-edge users are an important issue, and as one means, relay techniques are studied to relay radio transmission between a radio base station apparatus and a mobile terminal apparatus. Using the relay techniques, it is expected to efficiently increase coverage in a place where it is difficult to ensure a wired backhaul link, and the like.

In the relay techniques, there are a layer 1 relay, layer 2 relay and layer 3 relay. The layer 1 relay is a relay technique also called the booster or repeater, and is the AF (Amplifier and Forward) type relay technique for amplifying power of a downlink reception RF signal from a radio base station apparatus to transmit to a mobile terminal apparatus. An uplink reception RF signal from the mobile terminal apparatus also undergoes power amplification similarly and is transmitted to the radio base station apparatus. The layer 2 relay is the DF (Decode and Forward) type relay technique for demodulating and decoding a downlink reception RF signal from a radio base station apparatus, then performing coding and demodulation again, and transmitting the signal to a mobile terminal apparatus. The layer 3 relay is a relay technique for decoding a downlink reception RF signal from a radio base station apparatus, then reproducing user data, in addition to demodulation and decoding processing, performing processing (concealment, user data segmentation and packet concatenation processing, etc.) to perform radio user data transmission again, further performing coding and demodulation, and then, transmitting to a mobile terminal apparatus. Currently, in the 3GPP, standardization of the layer 3 relay technique has proceeded, from the viewpoints of improvements in reception characteristics due to noise cancellation and easiness in standard specification study and implementation.

FIG. 1 is a diagram illustrating the outline of the radio relay technique by the layer 3 relay. A radio relay station apparatus (RN) of the layer 3 relay is characterized by having a specific cell ID (PCI: Physical Cell ID) different from that of a radio base station apparatus (eNB) in addition to performing user data reproduction processing, modulation/demodulation and coding/decoding processing. By this means, a mobile terminal apparatus (UE) identifies a cell B formed by the radio relay station apparatus as a cell different from a cell A formed by the radio base station apparatus. Further, since control signals of physical layers such as a CQI (Channel Quality Indicator) and HARQ (Hybrid Automatic Repeat reQuest) are terminated in the radio relay station apparatus, the mobile terminal apparatus regards the radio relay station apparatus as a radio base station apparatus. Accordingly, mobile terminal apparatuses only having LTE functions are also capable of connecting to the radio relay station apparatus.

Further, it is considered that different frequencies or the same frequency is used to operate the backhaul link (Un) between the radio base station apparatus and the radio relay station apparatus, and access link (Uu) between the radio relay station apparatus and the mobile terminal apparatus, and in the latter case, when the radio relay station apparatus performs transmission and reception processing at the same, unless sufficient isolation is not secured in the transmission and reception circuits, a transmission signal enters a receiver of the radio relay station apparatus and causes interference. Therefore, as shown in FIG. 2, when the same frequency (f1) is used to operate, it is necessary to perform Time Division Multiplexing (TDM) on radio resources of the backhaul link and access link (eNB transmission and relay transmission) to control so that transmission and reception is not performed at the same time in the radio relay station apparatus (Non-patent Document 1). Therefore, for example, in downlink, the radio relay station apparatus is not able to transmit a downlink signal to a mobile terminal apparatus for a period during which a downlink signal is received from the radio base station apparatus.

In addition, in the case that the radio base station apparatus (eNB) transmits a downlink signal to a mobile terminal apparatus (UE) via the radio relay station apparatus (RN), there are an aspect (single hop relay) that the eNB transmits to the UE via a single RN as shown in FIG. 3(A), and another aspect (multi-hop relay) that the eNB transmits to the UE via a plurality (two in FIG. 3B) of RNs as shown in FIG. 3(B).

CITATION LIST

Non Patent Literature

[Non-patent Document 1] 3GPP, TR36.814

SUMMARY OF INVENTION

Technical Problem

As described above, as the aspect of relay transmission, there are the single hop relay and multi-hop relay. In the multi-hop relay in which the signal is transmitted via a plurality of RNs, the delay increases due to a plurality of relays. Therefore, it is preferable that the radio relay station apparatus is capable of identifying whether a received signal is a single hop relay signal or a multi-hop relay signal. However, under present circumstances, the radio relay station apparatus is not capable of identifying whether a received signal is a multi-hop relay signal.

The present invention was made in view of such a respect, and it is an object of the invention to provide a radio relay station apparatus and radio relay method for enabling the radio relay station apparatus to identify a multi-hop relay signal and relay a downlink signal suitably.

Solution to Problem

A radio relay station apparatus of the invention is characterized by having a reception section configured to receive a control signal indicative of passing through a radio relay station apparatus, a demodulation section configured to demodulate a downlink signal based on the control signal, a modulation section configured to modulate the downlink signal subjected to demodulation, and a transmission section configured to transmit the downlink signal subjected to modulation.

A radio relay method of the invention is characterized by having the steps, in a first radio relay station apparatus or a radio base station apparatus, of generating a control signal indicative of passing through a radio relay station apparatus, and transmitting the control signal in downlink, and the steps, in a second radio relay station apparatus, of receiving the control signal, demodulating a downlink signal based on the control signal, modulating the downlink signal subjected to demodulation, and transmitting the downlink signal subjected to modulation.

Advantageous Effects of Invention

In the invention, a first radio relay station apparatus or a radio base station apparatus generates a control signal indicative of passing through a radio relay station apparatus, and transmits the control signal in downlink, a second radio relay station apparatus receives the control signal, demodulates a downlink signal based on the control signal, modulates the downlink signal subjected to demodulation, and transmits the downlink signal subjected to modulation, and the radio relay station apparatus is thereby capable of identifying whether the signal is a signal of multi-hop relay transmission, and of relaying the downlink signal suitably.

DESCRIPTION OF EMBODIMENTS

Embodiments of the invention will specifically be described below.

Figure 1:
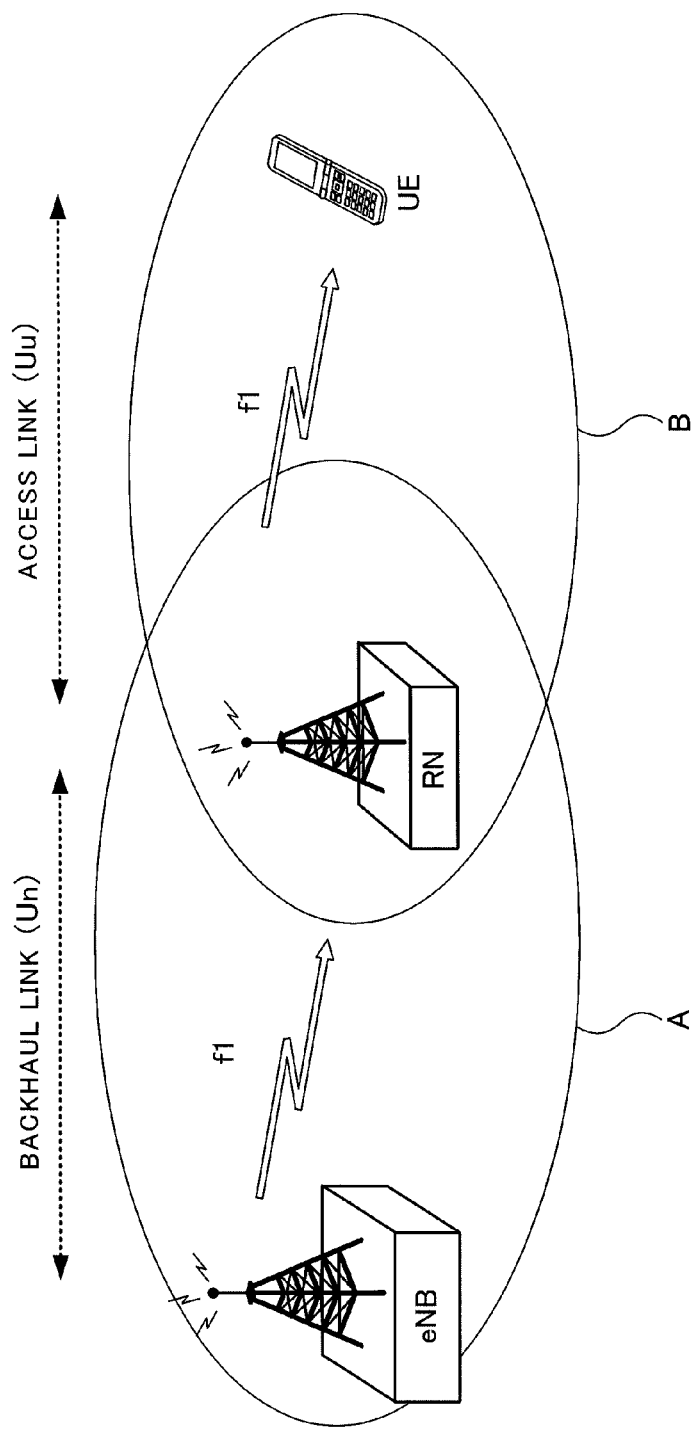
FIG. 1 is a diagram to explain relay transmission techniques.
Figure 2:
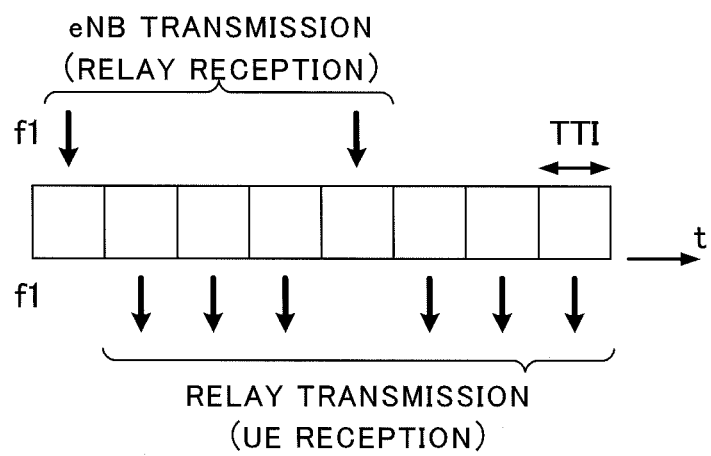
FIG. 2 is a diagram to explain radio resources of backhaul link and access link.
Figure 3A:
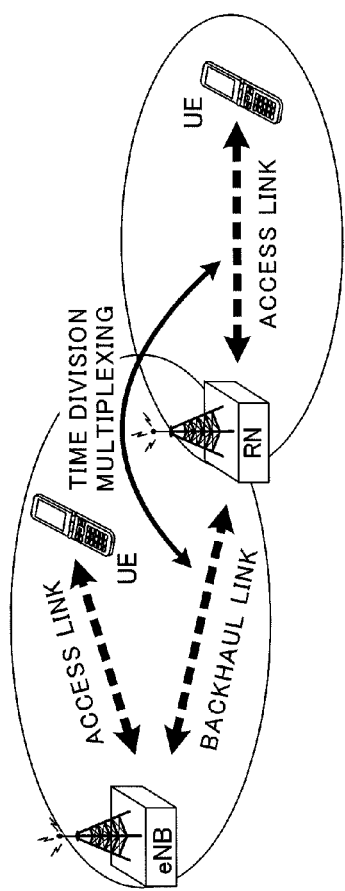
FIG. 3A is a diagram to explain a single hop relay.
Figure 3B:
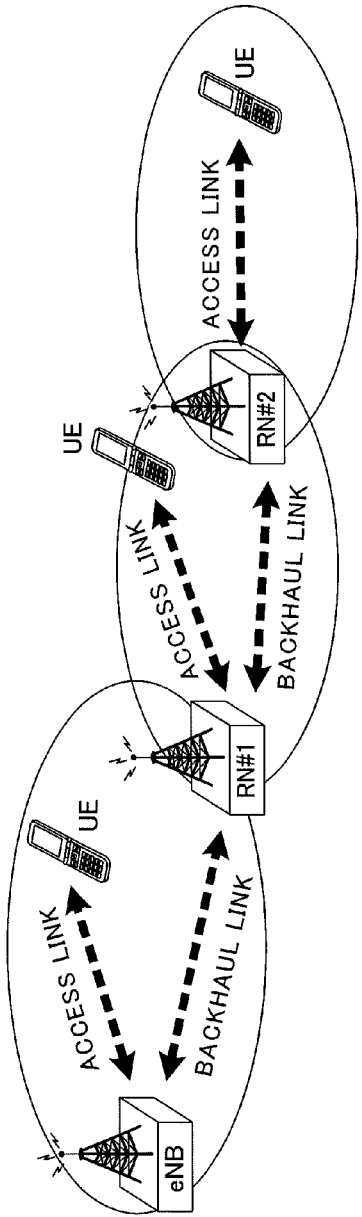
FIG. 3B is a diagram to explain a multi-hop relay
Figure 4:
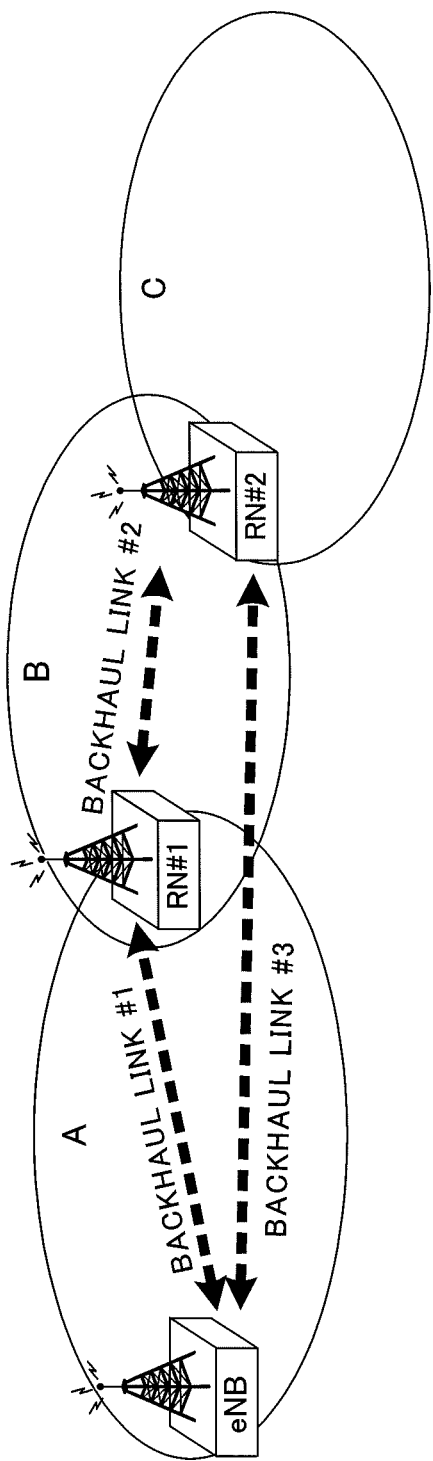
FIG. 4 is a diagram to explain a radio relay method according to the invention.

In FIG. 4, a cell A is a cell formed by a radio base station apparatus (eNB), a cell B is a cell formed by a radio relay station apparatus (RN) #1, and a cell C is a cell formed by a radio relay station apparatus (RN) #2.

In the configuration as shown in FIG. 4, there are a backhaul link #1 between the eNB and the RN #1, a backhaul link #2 between the RN #1 and the RN #2, and a backhaul link #3 between the eNB and the RN #2. The RN #2 receives a downlink signal from the eNB via the RN #1 i.e. a downlink signal (multi-hop relay transmission) via the backhaul links #1 and #2, and a downlink signal from the eNB (without passing through the RN) i.e. a downlink signal (single-hop relay transmission) via the backhaul link #3.

In the RN #2, since it is not possible to identify a downlink signal via the backhaul links #1 and #2, and a downlink signal via the backhaul link #3, in the invention is adopted a control signal (control signal for enabling a multi-hop relay transmission to be identified) indicative of passing through the radio relay station apparatus, and this control signal is transmitted to the RN (multi-hop relay transmission is notified.) In this case, the control signal is preferably multiplexed into a downlink control channel (R-PDCCH: Relay-Physical Downlink Control CHannel) for relay transmission or downlink control channel (PDCCH: Physical Downlink Control CHannel). Further, the control signal may be multiplexed into a PBCH (Physical Broadcast CHannel) or DBCH (Dynamic Broadcast CHannel) (Higher-layer signaling). In this case, for example, the control signal is included in an SIB (System Information Block) and MIB (Master Information Block).

Herein, the control signal may be a signal indicative of whether or not to pass through the radio relay station apparatus, or may be a signal specifically indicative of the number of hops (radio relay station apparatuses via which the signal is passed through).

The radio relay station apparatus receives a control signal including information on passing through the radio relay station apparatus, and based on the control signal, suitably relays the downlink signal. In this case, based on the control signal, the radio relay station apparatus may combine downlink signals from a plurality of (different) propagation paths. For example, in FIG. 4, the RN #2 combines a downlink signal of the backhaul link #2 and a downlink signal of the backhaul link #3. Thus, by combining downlink signals of different propagation paths, as compared with the case of not performing combining, it is possible to actualize high reception quality. In addition, in the case of combining downlink signals, a signal with the high number of radio relay station apparatuses (the high number of hops) via which the signal is transmitted has a possibility of increasing a delay in the combined signal, and therefore, may not be combined.

In the invention, based on the control signal indicative of passing through the radio relay station apparatus, a downlink signal to relay may be selected from among downlink signals from a plurality of propagation paths. For example, a downlink signal with the low number of radio relay station apparatuses (the low number of hops) via which the signal is transmitted may be selected from among downlink signals from a plurality of propagation paths, or a downlink signal with high reception power (or reception SINR (Signal to Interference plus Noise Ratio)) may be selected from among downlink signals from a plurality of propagation paths. For example, in FIG. 4, in the downlink signal of the backhaul link #2 and the downlink signal of the backhaul link #3, the downlink signal of the backhaul link #3 may be selected so as to decrease the number of hops (decrease a delay), and this downlink signal may be only relayed. Meanwhile, in FIG. 4, when reception power (or reception SINR) of the downlink signal of the backhaul link #2 is higher than reception power (or reception SINR) of the downlink signal of the backhaul link #3, the downlink signal of the backhaul link #2 may be selected so as to achieve higher throughput, and this downlink signal may be only relayed.

Further, based on the control signal, the radio relay station apparatus may select a combined signal subjected to combining of downlink signals from a plurality of (different) propagation paths, and relay the combined signal as a downlink signal. For example, in FIG. 4, the radio relay station apparatus may relay a combined signal of the downlink signal of the backhaul link #2 and the downlink signal of the backhaul link #3.

In the invention, a downlink signal to relay may be selected from among downlink signals from a plurality of propagation paths, without depending on a control signal indicative of passing through the radio relay station apparatus. For example, a downlink signal with high reception power (or reception SINR) may be selected from among downlink signals from a plurality of propagation paths, or a threshold of reception power (or reception SINR) may be beforehand set to select only a downlink signal exceeding the threshold. For example, in FIG. 4, when reception power (or reception SINR) of the downlink signal of the backhaul link #2 is higher than reception power (or reception SINR) of the downlink signal of the backhaul link #3, a reception signal level of the downlink signal of the backhaul link #2 is compared with a reception signal level of the downlink signal of the backhaul link #3, and the downlink signal of the backhaul link #2 with higher reception power may be selected so as to relay only the downlink signal. Alternatively, a threshold is compared with a reception signal level of the downlink signal of the backhaul link #2 and a reception signal level of the downlink signal of the backhaul link #3, and a downlink signal exceeding the threshold may be selected so as to relay only the downlink signal.

Embodiment 1

Figure 5:
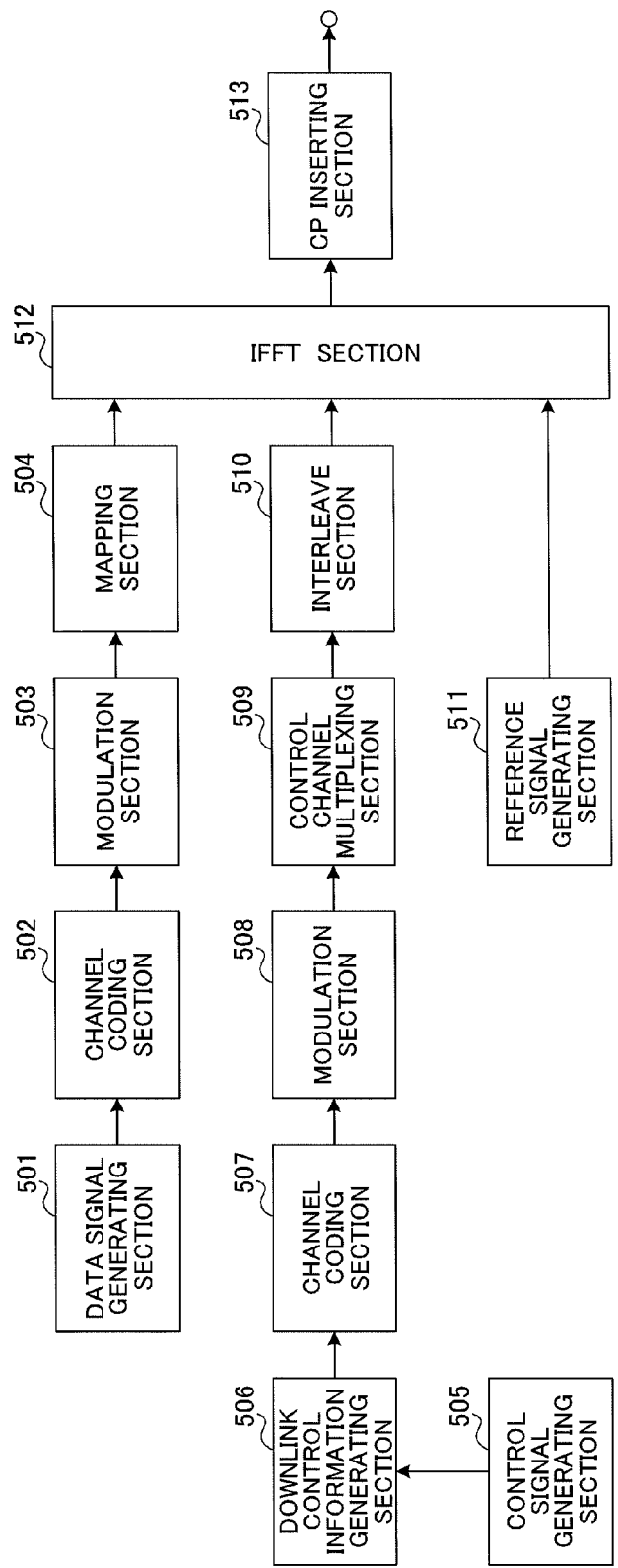
FIG. 5 is a diagram to explain a configuration of a transmission side of a radio relay station apparatus according to Embodiments of the invention.

FIG. 5 is a block diagram illustrating a schematic configuration of a transmission side of the radio relay station apparatus according to Embodiments of the invention. The configuration as shown in FIG. 5 is the same as a configuration of the transmission side of the radio base station apparatus. The transmission side of the radio relay station apparatus as shown in FIG. 5 is mainly comprised of a data signal generating section 501, channel coding sections 502, 507, modulation sections 503, 508, mapping section 504, control signal generating section 505, downlink control information generating section 506, control channel multiplexing section 509, interleave section 510, reference signal generating section 511, IFFT (Inverse Fast Fourier Transform) section 512, and CP (Cyclic Prefix) inserting section 513.

The data signal generating section 501 generates a data signal of downlink to be transmitted to a relay node (RN) and a data signal of downlink to be transmitted to a relay UE (mobile terminal apparatus under control of the relay node). The data signal generating section 501 outputs the downlink data signals to the channel coding section 502.

The channel coding section 502 performs channel coding on the downlink data signal. The channel coding section 502 outputs the channel-coded data signal to the modulation section 503. The modulation section 503 modulates channel-coded data. The modulation section 503 outputs the data-modulated data signal to the mapping section 504. The mapping section 504 maps the signal in the frequency domain to subcarriers based on resource allocation information. The mapping section 504 outputs the mapped data signal to the IFFT section 512. The control signal generating section 505 generates a control signal indicative of passing through the radio relay station apparatus. It is essential only that the control signal in this case is a signal indicative of whether a signal is transmitted via the radio relay station apparatus. For example, the control signal may be a signal (flag) of 1 bit indicative of whether or not to pass through the radio relay station apparatus, or a signal indicative of the number of radio relay station apparatuses via which a signal is transmitted. The control signal generating section 505 outputs the control signal to the downlink control information generating section 506.

The downlink control information generating section 506 generates downlink control information to be transmitted on the R-PDCCH or PDCCH. The downlink control information generating section 506 outputs the downlink control information to the channel coding section 507. The channel coding section 507 performs channel coding on the downlink control information. The channel coding section 507 outputs the channel-coded downlink control information to the modulation section 508. The modulation section 508 modulates the channel-coded downlink control information. The modulation section 508 outputs the data-modulated downlink control information to the control channel multiplexing section 509.

The control channel multiplexing section 509 multiplexes the downlink control information and control signal into the R-PDCCH or PDCCH. The control channel multiplexing section 509 outputs the multiplexed signal to the interleave section 510. The interleave section 510 interleaves the control channel signal multiplexed into the control channel. The interleave section 510 outputs the interleaved signal to the IFFT section 512.

The reference signal generating section 511 generates a reference signal, and outputs the reference signal to the IFFT section 512. The IFFT section 512 performs IFFT on the data signal, control channel signal and reference signal to transform into the signal in the time domain. The IFFT section 512 outputs the IFFT-processed signal to the CP inserting section 513. The CP inserting section 513 inserts a CP in the IFFT-processed signal. The signal with the CP inserted is transmitted in downlink in the backhaul link. By this means, it is possible to transmit the control signal indicative of passing through the radio relay station apparatus to the radio relay station apparatus. Consequently, the radio relay station apparatus having received the control signal is capable of identifying whether the received downlink signal is a signal transmitted via the radio relay station apparatus, and based on the identification, is capable of relaying the downlink signal suitably.

Figure 6:
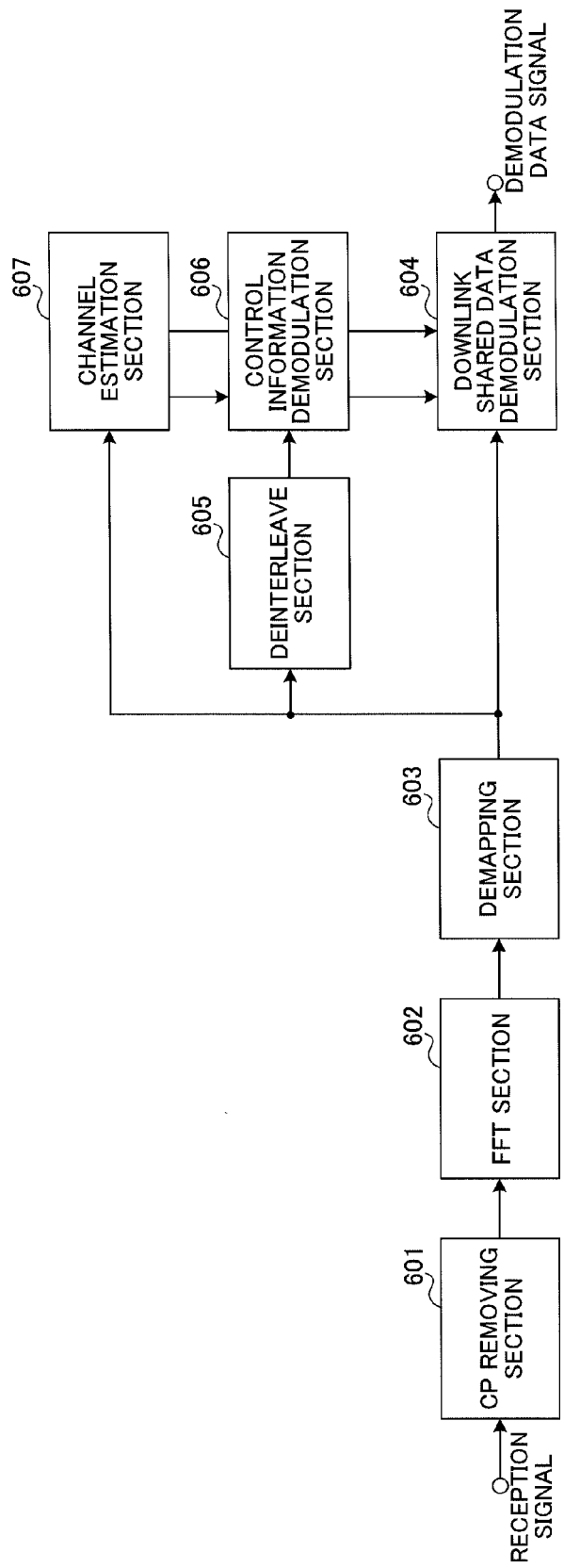
FIG. 6 is a diagram to explain a configuration of a reception side of the radio relay station apparatus according to Embodiment 1 of the invention.

FIG. 6 is a block diagram illustrating a schematic configuration of a reception side of the radio relay station apparatus according to Embodiment 1 of the invention. The radio relay station apparatus as shown in FIG. 6 has a CP removing section 601, FFT (Fast Fourier Transform) section 602, demapping section 603, downlink shared data demodulation section 604, deinterleave section 605, control information demodulation section 606, and channel estimation section 607.

The CP removing section 601 removes a CP from a reception signal. The CP removing section 601 outputs the CP-removed signal to the FFT section 602. The FFT section 602 performs FFT processing on the CP-removed signal. The FFT section 602 outputs the FFT-processed signal to the demapping section 603. The demapping section 603 demaps the FFT-processed signal, and outputs the demapped signal to the downlink shared data demodulation section 604, while outputting the signal to the deinterleave section 605 and the channel estimation section 607.

The channel estimation section 607 performs channel estimation using a reference signal, and outputs the channel estimation value to the downlink shared data demodulation section 604 and the control information demodulation section 606. The deinterleave section 605 deinterleaves the demapped signal. The deinterleave section 605 outputs the deinterleaved signal to the control information demodulation section 606.

The control information demodulation section 606 modulates the control information including the downlink control information and control signal using the channel estimation value obtained in the channel estimation section 607. By this means, it is possible to demodulate the control signal indicative of passing through the radio relay station apparatus, and on the received downlink signal, it is possible to identify whether the downlink signal is transmitted via the radio relay station apparatus (or the number of times the downlink signal is transmitted via the radio relay station apparatus (the number of hops)). The control information demodulation section 606 outputs the demodulated downlink control information and control signal to the downlink shared data demodulation section 604.

The downlink shared data demodulation section 604 demodulates a downlink shared data signal using the channel estimation value obtained in the channel estimation section 607. Thus obtained data signal is subjected to channel coding again, modulated, and then, is transmitted to the relay UE or another RN as a downlink signal.

Described is a radio relay method by the radio relay station apparatus having the above-mentioned configuration. In the radio relay method according to the invention, a first radio relay station apparatus or a radio base station apparatus generates a control signal indicative of passing through a radio relay station apparatus, and transmits the control signal in downlink, and a second radio relay station apparatus receives the control signal, demodulates a downlink signal based on the control signal, modulates the downlink signal subjected to demodulation, and transmits the downlink signal subjected to modulation.

The method will specifically be described using the configuration as shown in FIG. 4. Described first is the cast that the eNB transmits a downlink signal to the RN #1 or RN #2 in the backhaul link #1 or backhaul link #3. In this case, the control signal generating section 505 generates a control signal indicative of passing through the radio relay station apparatus. Herein, since the downlink signal is not transmitted via any radio relay station apparatus, the section 505 generates a control signal (for example, bit "0") indicative of not passing through any radio relay station apparatus. Then, a signal with the control signal multiplexed thereinto is transmitted to the RN #1 or RN #2 on the R-PDCCH or PDCCH of the backhaul link #1 or backhaul link #3. In the RN #1 or RN #2, the control information demodulation section 606 demodulates the control signal (for example, bit "0") indicative of not passing through any radio relay station apparatus. By this means, the RN #1 or RN #2 is capable of identifying that the downlink signal received from the eNB is not via any radio relay station apparatus. Further, the downlink shared data demodulation section 604 of the RN #1 or RN #2 demodulates a downlink shared data signal transmitted on the R-PDCCH or PDCCH of the backhaul link #1 or backhaul link #3. Subsequently, based on the control signal (in consideration of not passing through any radio relay station apparatus), when necessary, the RN #1 or RN #2 performs suitable processing on the demodulated downlink shared data signal, and transmits the downlink shared data signal to another RN or relay UE.

Described next is the case that the RN #1 transmits a downlink signal to the RN #2 in the backhaul link #2. In this case, the control signal generating section 505 generates a control signal indicative of passing through the radio relay station apparatus. Herein, since the downlink signal is transmitted via the radio relay station apparatus, the section 505 generates a control signal (for example, bit "1") indicative of passing through the radio relay station apparatus. Then, a signal with the control signal multiplexed thereinto is transmitted to the RN #2 on the R-PDCCH or PDCCH of the backhaul link #2. In the RN #2, the control information demodulation section 606 demodulates the control signal (for example, bit "1") indicative of passing through the radio relay station apparatus. By this means, the RN #2 is capable of identifying that the downlink signal received from the RN #1 is via the radio relay station apparatus. Further, the downlink shared data demodulation section 604 of the RN #2 demodulates a downlink shared data signal transmitted on the R-PDCCH or PDCCH of the backhaul link #2. Subsequently, based on the control signal (in consideration of passing through the radio relay station apparatus), when necessary, the RN #2 performs suitable processing on the demodulated downlink shared data signal, performs channel coding and modulation again, and then, transmits the downlink shared data signal to another RN or relay UE.

Thus, in the radio relay method according to this Embodiment, a first radio relay station apparatus or a radio base station apparatus generates a control signal indicative of passing through a radio relay station apparatus, and transmits the control signal in downlink, and a second radio relay station apparatus receives the control signal, demodulates a downlink signal based on the control signal, modulates the demodulated downlink signal, transmits the modulated downlink signal, and is thereby capable of identifying whether the signal is a signal of multi-hop relay transmission, and of relaying the downlink signal suitably.

Embodiment 2

This Embodiment describes the case that a radio relay station apparatus combines downlink signals from a plurality of (different) propagation paths based on a control signal. A configuration of a transmission side of the radio relay station apparatus in this Embodiment is the same as the configuration as shown in FIG. 5.

Figure 7:
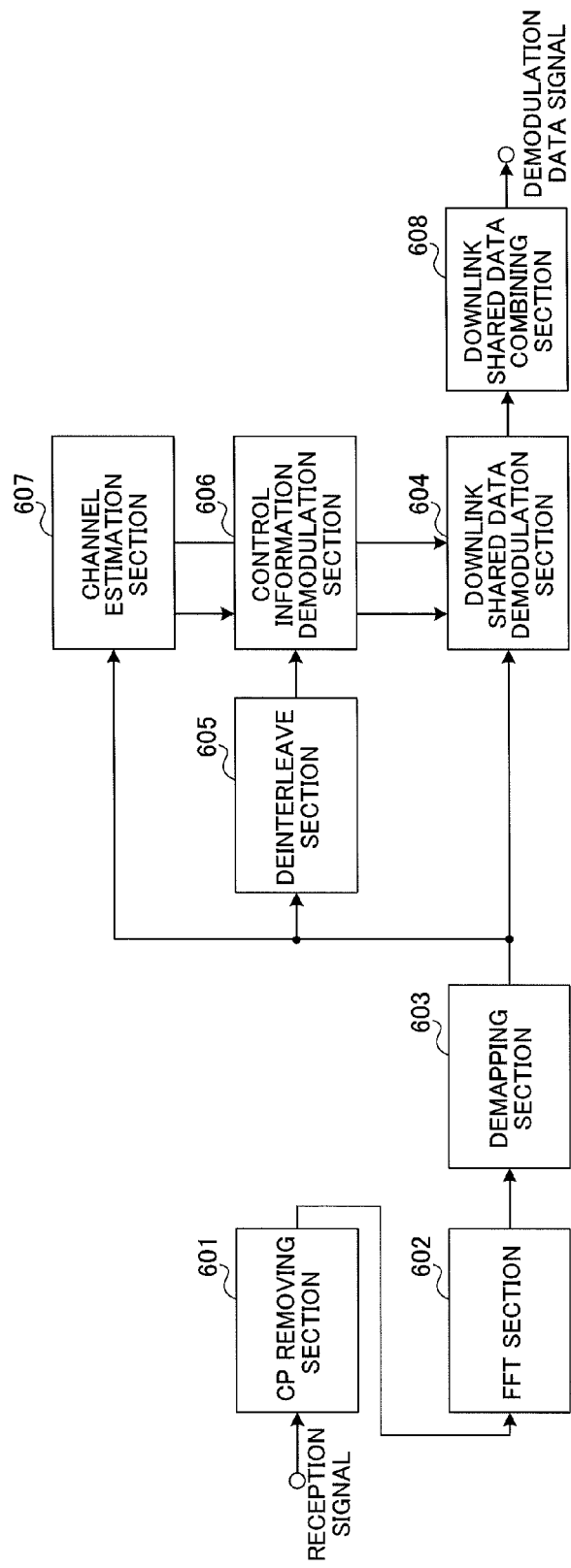
FIG. 7 is a diagram to explain a configuration of a reception side of the radio relay station apparatus according to Embodiment 2 of the invention.

FIG. 7 is a block diagram illustrating a schematic configuration of a reception side of the radio relay station apparatus according to Embodiment 2 of the invention. In FIG. 7, the same portions as in FIG. 6 are assigned the same reference numerals as in FIG. 6 to omit specific descriptions thereof. The radio relay station apparatus as shown in FIG. 7 is provided with a downlink shared data combining section 608 that combines a plurality of downlink shared data signals demodulated in the downlink shared data demodulation section 604.

The downlink shared data combining section 608 combines downlink shared data signals of different propagation paths. Thus obtained combined data signal undergoes channel coding again, is modulated, and then, is transmitted to a relay UE or another RN as a downlink signal. Since a signal with the high number of radio relay station apparatuses (the high number of hops) via which the signal is transmitted has a possibility of increasing a delay in the combined signal, the downlink shared data combining section 608 may not combine the signal.

Described is a radio relay method by the radio relay station apparatus having the above-mentioned configuration. The method will specifically be described using the configuration as shown in FIG. 4. The control signal generating sections 505 in the eNB and RN #1 generate a control signal indicative of whether or not to pass through the radio relay station apparatus. Herein, in the eNB, since the downlink signal is not transmitted via any radio relay station apparatus, the section 505 generates a control signal (for example, bit "0") indicative of not passing through any radio relay station apparatus. In the RN #1, since the downlink signal is transmitted via the radio relay station apparatus, the section 505 generates a control signal (for example, bit "1") indicative of passing through the radio relay station apparatus. Then, a signal with the control signal multiplexed thereinto is transmitted to the RN #2 on the R-PDCCH or PDCCH of the backhaul link #2 or backhaul link #3. In the RN #2, the control information demodulation section 606 demodulates the control signal (for example, bit "0", bit "1") indicates of whether or not to pass through the radio relay station apparatus. Further, the downlink shared data demodulation section 604 of the RN #2 demodulates a downlink shared data signal transmitted on the R-PDCCH or PDCCH of the backhaul link #2 or backhaul link #3.

The downlink shared data combining section 608 combines the downlink shared data signal received via the backhaul link #2 and the downlink shared data signal received via the backhaul link #3. At this point, it is preferable that the downlink shared data combining section 608 determines whether to combine a plurality of downlink shared data signals based on the control signal indicative of whether or not to pass through the radio relay station apparatus. In other words, when the control signal includes the information indicative of the number of hops, the section 608 is capable of eliminating a signal with the high number of radio relay station apparatuses (the higher number of hops) via which the signal is transmitted, and combining signals with the low number of hops. By this means, it is possible to achieve high reception quality. Subsequently, the RN #2 performs channel coding and modulation again, and transmits the downlink shared data signal to another RN or relay UE.

Thus, in the radio relay method according to this Embodiment, a first radio relay station apparatus or a radio base station apparatus generates a control signal indicative of passing through a radio relay station apparatus, and transmits the control signal in downlink, and a second radio relay station apparatus receives the control signal, demodulates a downlink signal based on the control signal, combines demodulated downlink signals, then modulates, transmits the modulated downlink signal, and is thereby capable of identifying whether the signal is a signal of multi-hop relay transmission, and of relaying the downlink signal suitably, while achieving high reception quality.

Embodiment 3

This Embodiment describes the case that a radio relay station apparatus selects a downlink signal to relay from among downlink signals from a plurality of propagation paths based on a control signal. A configuration of a transmission side of the radio relay station apparatus in this Embodiment is the same as the configuration as shown in FIG. 5.

Figure 8:
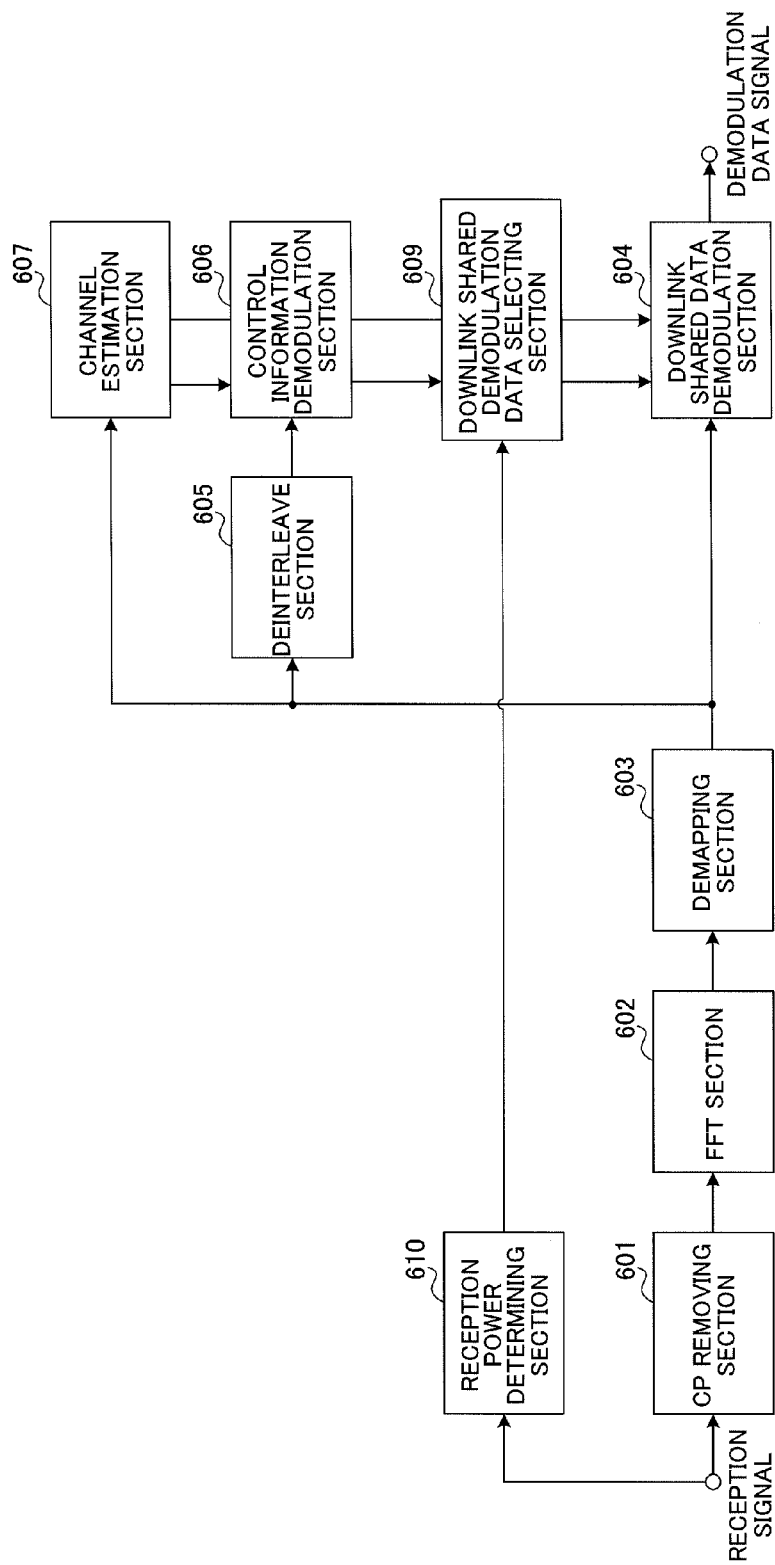
FIG. 8 is a diagram to explain a configuration of a reception side of the radio relay station apparatus according to Embodiment 3 of the invention.

FIG. 8 is a block diagram illustrating a schematic configuration of a reception side of the radio relay station apparatus according to Embodiment 3 of the invention. In FIG. 8, the same portions as in FIG. 6 are assigned the same reference numerals as in FIG. 6 to omit specific descriptions thereof. The radio relay station apparatus as shown in FIG. 8 is provided with a downlink shared demodulation data selecting section 609 that selects a downlink signal to relay from among downlink signals from a plurality of propagation paths based on a control signal indicative of passing through a radio relay station apparatus, and a reception power determining section 610 that determines reception power of a reception signal.

Based on a control signal indicative of passing through the radio relay station apparatus, the downlink shared demodulation data selecting section 609 selects a downlink shared demodulation data signal to relay from among downlink shared demodulation data signals from a plurality of propagation paths. In this case, the downlink shared demodulation data selecting section 609 selects a downlink shared demodulation data signal with the low number of radio relay station apparatuses (the low number of hops) via which the signal is transmitted from among downlink shared demodulation data signals from a plurality of propagation paths. By this means, it is possible to relay a shared demodulation data signal with a low delay. The downlink shared demodulation data selecting section 609 outputs selection information of downlink shared demodulation data to the downlink shared data demodulation section 604.

The reception power determining section 610 determines reception power of downlink signals from a plurality of propagation paths, and outputs the reception power to the downlink shared demodulation data selecting section 609. The downlink shared demodulation data selecting section 609 may select a downlink shared demodulation data signal with high reception power from among downlink shared demodulation data signals from a plurality of propagation paths. In this case, it is preferable that the downlink shared demodulation data selecting section 609 selects a downlink shared demodulation data signal while considering both the number of radio relay station apparatuses (the number of hops) via which the signal is transmitted and reception power. By this means, it is possible to relay a shared demodulation data signal with high reception quality. In addition, this Embodiment describes the case of using reception power as a selection criterion parameter, but the invention is not limited thereto, and allows the reception SINR to be used as a selection criterion parameter.

Described is a radio relay method by the radio relay station apparatus having the above-mentioned configuration. The method will specifically be described using the configuration as shown in FIG. 4. The control signal generating sections 505 in the eNB and RN #1 generate a control signal indicative of whether or not to pass through the radio relay station apparatus. Herein, in the eNB, since the downlink signal is not transmitted via any radio relay station apparatus, the section 505 generates a control signal (for example, bit "0") indicative of not passing through any radio relay station apparatus. In the RN #1, since the downlink signal is transmitted via the radio relay station apparatus, the section 505 generates a control signal (for example, bit "1") indicative of passing through the radio relay station apparatus. Then, a signal with the control signal multiplexed thereinto is transmitted to the RN #2 on the R-PDCCH or PDCCH of the backhaul link #2 or backhaul link #3. In the RN #2, the control information demodulation section 606 demodulates the control signal (for example, bit "0" or bit "1") indicative of whether or not to pass through the radio relay station apparatus.

The downlink shared demodulation data selecting section 609 selects the downlink shared data signal of the backhaul link #3 from the downlink shared data signal of the backhaul link #2 and the downlink shared data signal of the backhaul link #3 so that the number of hops is lower (the delay is smaller). Alternatively, when reception power of the downlink shared data signal of the backhaul link #2 is higher than reception power of the downlink shared data signal of the backhaul link #3, the downlink shared demodulation data selecting section 609 selects the downlink shared data signal of the backhaul link #2 so as to enable higher throughput to be achieved.

The downlink shared data demodulation section 604 of the RN #2 demodulates the downlink shared data signal selected in the downlink shared demodulation data selecting section 609. In other words, in the aforementioned case, the section 604 demodulates only the downlink shared data signal of the backhaul link #3 in selecting so as to decrease the number of hops, while demodulating only the downlink shared data signal of the backhaul link #2 in selecting so as to achieve higher throughput. Subsequently, the RN #2 performs channel coding and modulation again, and then, transmits the downlink shared data signal to another RN or relay UE.

Thus, in the radio relay method according to this Embodiment, a first radio relay station apparatus or a radio base station apparatus generates a control signal indicative of passing through a radio relay station apparatus, and transmits the control signal in downlink, and a second radio relay station apparatus receives the control signal, demodulates a downlink signal based on the control signal, selects the demodulated downlink signal, then modulates, transmits the modulated downlink signal, and is thereby capable of identifying whether the signal is a signal of multi-hop relay transmission, and of relaying the downlink signal suitably.

Embodiment 4

This Embodiment describes the case that a radio relay station apparatus selects a downlink signal to relay from among downlink signals from a plurality of propagation paths without depending on a control signal. A configuration of a transmission side of the radio relay station apparatus in this Embodiment is the same as the configuration as shown in FIG. 5 except that the control signal generating section 505 is not provided.

Figure 9:
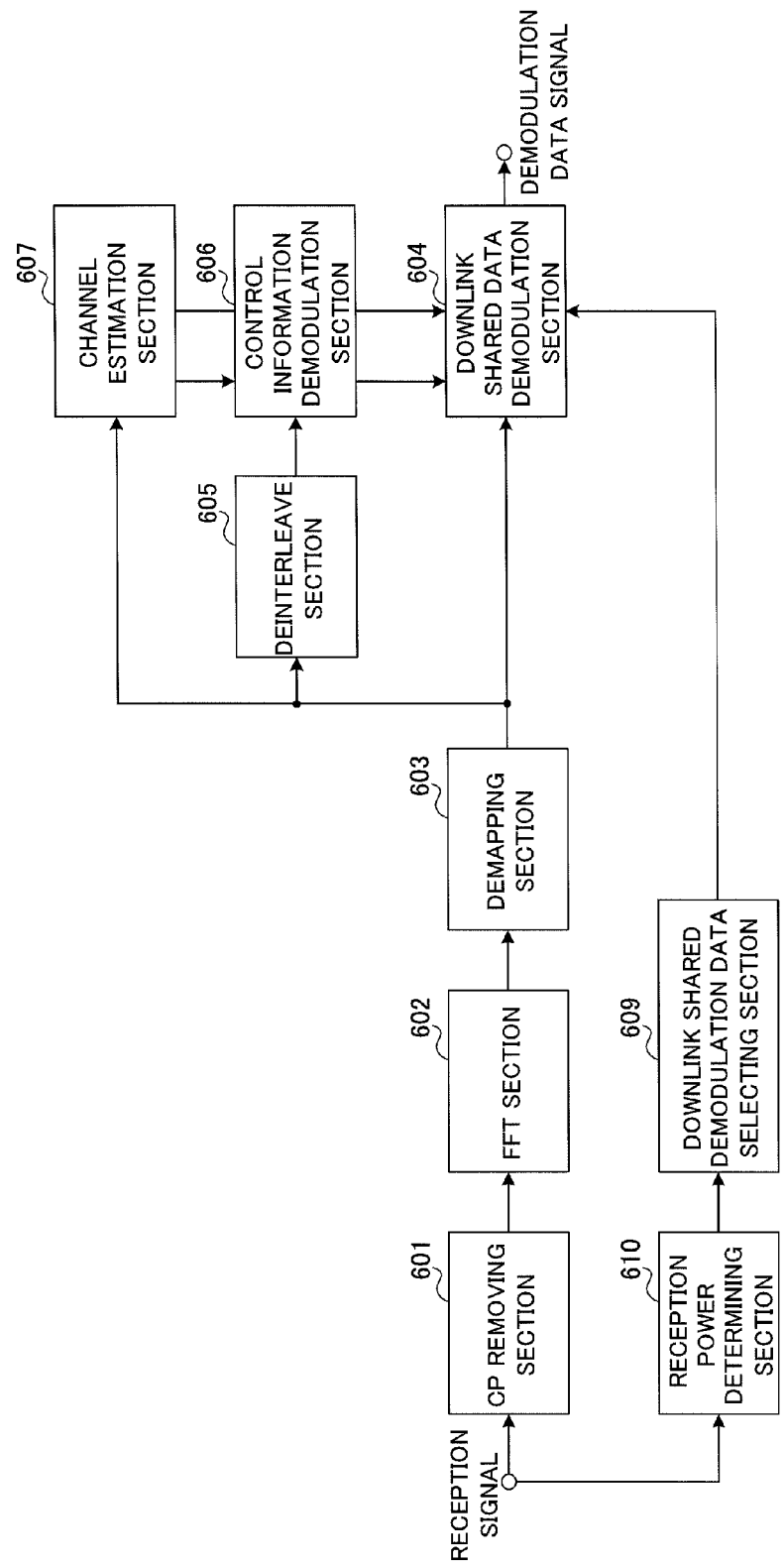
FIG. 9 is a diagram to explain a configuration of a reception side of the radio relay station apparatus according to Embodiment 4 of the invention.

FIG. 9 is a block diagram illustrating a schematic configuration of a reception side of the radio relay station apparatus according to Embodiment 4 of the invention. In FIG. 9, the same portions as in FIG. 6 are assigned the same reference numerals as in FIG. 6 to omit specific descriptions thereof. The radio relay station apparatus as shown in FIG. 9 is provided with the downlink shared demodulation data selecting section 609 that selects a downlink signal to relay from among downlink signals from a plurality of propagation paths based on a control signal indicative of passing through a radio relay station apparatus, and the reception power determining section 610 that determines reception power of a reception signal.

The reception power determining section 610 determines reception power of downlink shared data signals from a plurality of propagation paths, and outputs the reception power to the downlink shared demodulation data selecting section 609. The downlink shared demodulation data selecting section 609 selects a downlink shared demodulation data signal with high reception power from among downlink shared demodulation data signals from a plurality of propagation paths. By this means, it is possible to relay a shared demodulation data signal with higher reception quality. The downlink shared demodulation data selecting section 609 outputs selection information of downlink shared demodulation data to the downlink shared data demodulation section 604. In addition, this Embodiment describes the case of using reception power as a selection criterion parameter, but the invention is not limited thereto, and allows the reception SINR to be used as a selection criterion parameter.

Described is a radio relay method by the radio relay station apparatus having the above-mentioned configuration. The method will specifically be described using the configuration as shown in FIG. 4.

The reception power determining section 610 determines (measures) reception power of downlink shared data signals from a plurality of propagation paths. Based on the reception power, the downlink shared demodulation data selecting section 609 selects a downlink shared data signal to demodulate.

When reception power of the downlink signal of the backhaul link #2 is higher than reception power of the downlink shared data signal of the backhaul link #3, a reception signal level of the downlink shared data signal of the backhaul link #2 is compared with a reception signal level of the downlink shared data signal of the backhaul link #3, and the downlink shared data signal of the backhaul link #2 with higher reception power is selected. Then, the downlink shared data demodulation section 604 demodulates the downlink shared data signal selected in the downlink shared demodulation data selecting section 609. Subsequently, the RN #2 performs channel coding and modulation again, and then, transmits the downlink shared data signal to another RN or relay UE.

Thus, in the radio relay method according to this Embodiment, the radio relay station apparatus demodulates a downlink signal, measures reception quality (reception power or reception SINR), selects the demodulated downlink signal based on the reception quality, then modulates, transmits the modulated downlink signal, and is thereby capable of relaying the downlink signal suitably.

The present invention is not limited to above-mentioned Embodiments 1 to 4, and is capable of being carried into practice with various modifications thereof. For example, above-mentioned Embodiments 1 to 4 describe the case that the number of propagation paths reaching the RN is two, but the invention is not limited thereto, and is similarly applicable to the case that the number of propagation paths reaching the RN is three or more.

The Embodiments disclosed this time are illustrative in all the respects, and the present invention is not limited to the Embodiments. The scope of the invention is indicated by the scope of the claims rather than by the descriptions of only the above-mentioned Embodiments, and is intended to include senses equal to the scope of the claims and all modifications within the scope of the claims.

INDUSTRIAL APPLICABILITY

The present invention is useful in radio relay station apparatuses and radio relay methods in the LTE-A system.

The present application is based on Japanese Patent Application No. 2010-140337 filed on Jun. 21, 2010, entire content of which is expressly incorporated by reference herein.

The invention claimed is:

1. A radio relay station apparatus having a processor, the processor comprising:

a reception section configured to receive a control signal that indicates whether or not a data signal of downlink is passed through another radio relay station apparatus;

a demodulation section configured to demodulate data signals of downlink from a plurality of propagation paths;

a combining section configured to combine the data signals of downlink based on the control signal;

a modulation section configured to modulate the data signals of downlink subjected to combination; and a transmission section configured to transmit the data signals of downlink subjected to modulation.

2. A radio relay method comprising the steps of:
in a first radio relay station apparatus or a radio base station apparatus,
generating a control signal that indicates whether or not a data signal is passed through a radio relay station apparatus;
transmitting the control signal in downlink;
in a second radio relay station apparatus,
receiving the control signal;
demodulating data signals of downlink from a plurality of propagation paths;
combining the data signals of downlink based on the control signal;
modulating the data signals of downlink subjected to combination; and
transmitting the data signals of downlink subjected to modulation.

* * * * *